(12) United States Patent
Koh

(10) Patent No.: US 6,843,501 B1
(45) Date of Patent: Jan. 18, 2005

(54) PASSENGER AIR BAG SYSTEM FOR VEHICLES

(75) Inventor: Min Seok Koh, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/702,541

(22) Filed: Nov. 7, 2003

(30) Foreign Application Priority Data

Oct. 17, 2003 (KR) .................................. 10-2003-0072617

(51) Int. Cl.⁷ .............................................. B60R 21/16
(52) U.S. Cl. .................................... 280/728.2; 280/732
(58) Field of Search .......................... 280/728.2, 728.3, 280/732, 731

(56) References Cited

U.S. PATENT DOCUMENTS

| | | | | |
|---|---|---|---|---|
| 3,822,894 A | * | 7/1974 | Muller et al. ................ | 280/731 |
| 5,511,818 A | * | 4/1996 | Jarboe et al. ............. | 280/728.2 |
| 5,762,360 A | * | 6/1998 | Damman et al. ......... | 280/728.2 |
| 5,772,241 A | * | 6/1998 | Heilig ......................... | 280/731 |

* cited by examiner

*Primary Examiner*—Faye M. Fleming
(74) *Attorney, Agent, or Firm*—Greenblum & Bernstein, P.L.C.

(57) ABSTRACT

A passenger air bag system for vehicles includes a cushion expanded to the front of a passenger when a collision of the vehicle occurs, an air bag housing mounted to an instrument panel at the front part thereof for accommodating the cushion therein, a retainer attached to the air bag housing for supporting the cushion, an inflator having the upper end vertically inserted into the rear part of the air bag housing in the normal direction thereof so that the inflator discharges gas to the cushion and the lower end fixed to the outer circumference of a cowl cross member, and an inflator bracket attached to the air bag housing for fixedly supporting the upper end of the inflator.

19 Claims, 6 Drawing Sheets

PASSENGER AIR BAG SYSTEM FOR VEHICLES

RELATED APPLICATIONS

The present disclosure relates to subject matter contained in Korean Application No. 10-2003-72617, filed on Oct. 17, 2003, which is herein expressly incorporated by reference in its entirety.

BACKGROUND OF THE INVENTION

1. Field of the Invention

The present invention relates to an air bag system for vehicles, and more particularly to a passenger air bag system for vehicles, which is capable of preventing eccentric expansion of a cushion when a collision of the vehicle occurs by improvement of the installation structure of an air bag housing and an inflator.

2. Description of the Related Art

Generally, an air bag system for vehicles is mounted in front of a driver seat or a passenger seat in such a manner that a cushion of the air bag system is instantly expanded when a collision of the vehicle occurs for protecting a driver or a passenger from injury.

The air bag systems may be classified into a driver air bag system and a passenger air bag system. The driver air bag system is mounted to the steering wheel of the vehicle for protecting the driver from injury. The passenger air bag system is mounted to an instrument panel of the vehicle disposed in front of the passenger seat for protecting the passenger from injury. Basically, the driver air bag system is requisite, and the passenger air bag system is optional; however, vehicles with passenger air bag systems basically mounted therein for protecting passengers from injury are on the increase in recent years.

FIG. 1 is a perspective view showing a conventional passenger air bag system, FIG. 2 is a front view, in section, showing the conventional passenger air bag system, and FIG. 3 is a side view, in section, showing the conventional passenger air bag system.

As shown in FIGS. 1 to 3, the conventional passenger air bag system for vehicles comprises: an air bag housing 4 mounted to an instrument panel 2; an inflator 6 attached to the rear part of the air bag housing 4 for discharging gas when a collision of the vehicle occurs; a cushion 8 accommodated in the front part of the air bag housing 4 such that the cushion 8 is expanded to the front of a passenger seat by means of gas discharged from the inflator 6; and a retainer 10 attached to the air bag housing 4 between the cushion 8 and the inflator 6 for supporting the cushion 8, the retainer 10 having a plurality of gas-guiding holes 10a for guiding gas discharged from the inflator 6 to the cushion 8.

The air bag housing 4 comprises: a cushion housing 12 formed in the shape of a box with the front part opened so that the cushion 8 is accommodated in the cushion housing 12 while being folded; and a can housing 14 connected to the rear part of the cushion housing 12, in which the inflator 6 is disposed.

The cushion housing 12 is provided at both longitudinal sides thereof with flanges 12a, respectively, which are fixed to the rear part of the instrument panel 2 by means of bolts. At the instrument panel 2 is formed a cut line 2a so that the instrument panel 2 is easily and smoothly broken along the cut line 2a by means of the expanding pressure of the cushion 8.

The can housing 14 is connected to the rear part of the cushion housing 12 in such a manner that the can housing 14 communicates with the cushion housing 12. The can housing 14 is provided at the outside thereof with a mounting bracket 16, which is fixed to a cowl cross member 18 by means of a bolt.

The inflator 6 is formed in the shape of a cylinder. The inflator 6 is provided on the outer circumference at one side thereof with a plurality of gas-discharging holes 20 for discharging gas when a collision of the vehicle occurs.

At one end of the inflator 6 is formed a fixing protrusion 22 having a male screw thread part formed on the outer circumference thereof, on which a fixing nut 24 is rotatably fitted so that the inflator 6 is attached to the side of the can housing 14. At the other end of the inflator 6 is formed a connector coupling member 26 in such a manner that the connector-connecting member 26 is protruded outwardly. To the inflator 6 is connected a connector 28, by which the inflator 6 is linked to an external component, through the connector-connecting member 26.

The connector 28 is disposed outside the air bag housing 4. One end of the connector 28 is connected to the connector-connecting member 26 via a wire 28a, and the other end of the connector 28 is connected to an electronic control unit and a power supply terminal via the wire 28a.

When a collision of the vehicle is detected by means of a collision-detecting sensor (not shown) mounted to the vehicle, an operation signal is transmitted from the electronic control unit to the inflator 6 via the connecter 28. The inflator 6 is exploded by means of electric current supplied from the power supply terminal for discharging gas having more than a prescribed pressure through the gas-discharging holes 20.

The inlet part of the cushion 8 is disposed between the retainer 10 and the can housing 14, and is attached to the can housing 14 together with the retainer 10 by means of bolts so that the cushion 8 can be fixedly supported by means of the retainer 10.

In the conventional passenger air bag system for vehicles with the above-stated construction, the operation signal is transmitted from the electronic control unit to the inflator 6 via the connector 28 when a collision of the vehicle occurs, and then the inflator 6, to which electric current is supplied from the power supply terminal, is exploded to discharge gas through the gas-discharging holes 20.

The gas discharged from the inflator 6 flows along the can housing 14 so that the gas is supplied into the cushion 8 through the gas-guiding holes 10a of the retainer 10. The cushion 8 is expanded to the front of the cushion housing 12 by means of the gas supplied into the cushion 8.

The instrument panel 2 is broken along the cut line 2a formed at the instrument panel 2 by means of the cushion 8 expanded as described above. Subsequently, the cushion 8 is expanded toward a passenger seated in the passenger seat, whereby shock transmitted to the passenger is effectively absorbed, and thus injury to the passenger is minimized.

In the conventional passenger air bag system for vehicles, however, the inflator 6 is horizontally disposed in the can housing 14, and the gas-discharging holes 20 are formed adjacent to one end of the inflator 6. As a result, the cushion 8 is eccentrically expanded by means of the gas discharged through the gas-discharging holes 20 when a collision of the vehicle occurs.

In other words, the gas discharged through the gas-discharging holes 20 eccentrically formed at the inflator 6 is not uniformly supplied into the cushion 8 with the result that the expansion shape of the cushion differs from the designed shape of the cushion. Consequently, the cushion 8 expanded to the front of the passenger seat performs an incomplete shock-absorbing function, whereby safety and reliability of the air bag system are deteriorated.

SUMMARY OF THE INVENTION

Therefore, the present invention has been made in view of the above problems, and it is an object of the present invention to provide a passenger air bag system for vehicles having an inflator attached to an air bag housing such that gas-discharging holes are arranged at the center of the air bag housing, whereby a cushion is expanded in a uniform shape not in an eccentric shape by means of gas discharged through the gas-discharging holes when a collision of the vehicle occurs, and thus injury to a passenger is minimized.

In accordance with the present invention, the above and other objects can be accomplished by the provision of a passenger air bag system for vehicles, comprising: a cushion expanded to the front of a passenger when a collision of the vehicle occurs; an air bag housing mounted to an instrument panel at the front part thereof for accommodating the cushion therein; a retainer attached to the air bag housing for supporting the cushion; an inflator having the upper end vertically inserted into the rear part of the air bag housing in the normal direction thereof so that the inflator discharges gas to the cushion, and the lower end fixed to the outer circumference of a cowl cross member; and an inflator bracket attached to the air bag housing for fixedly supporting the upper end of the inflator.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
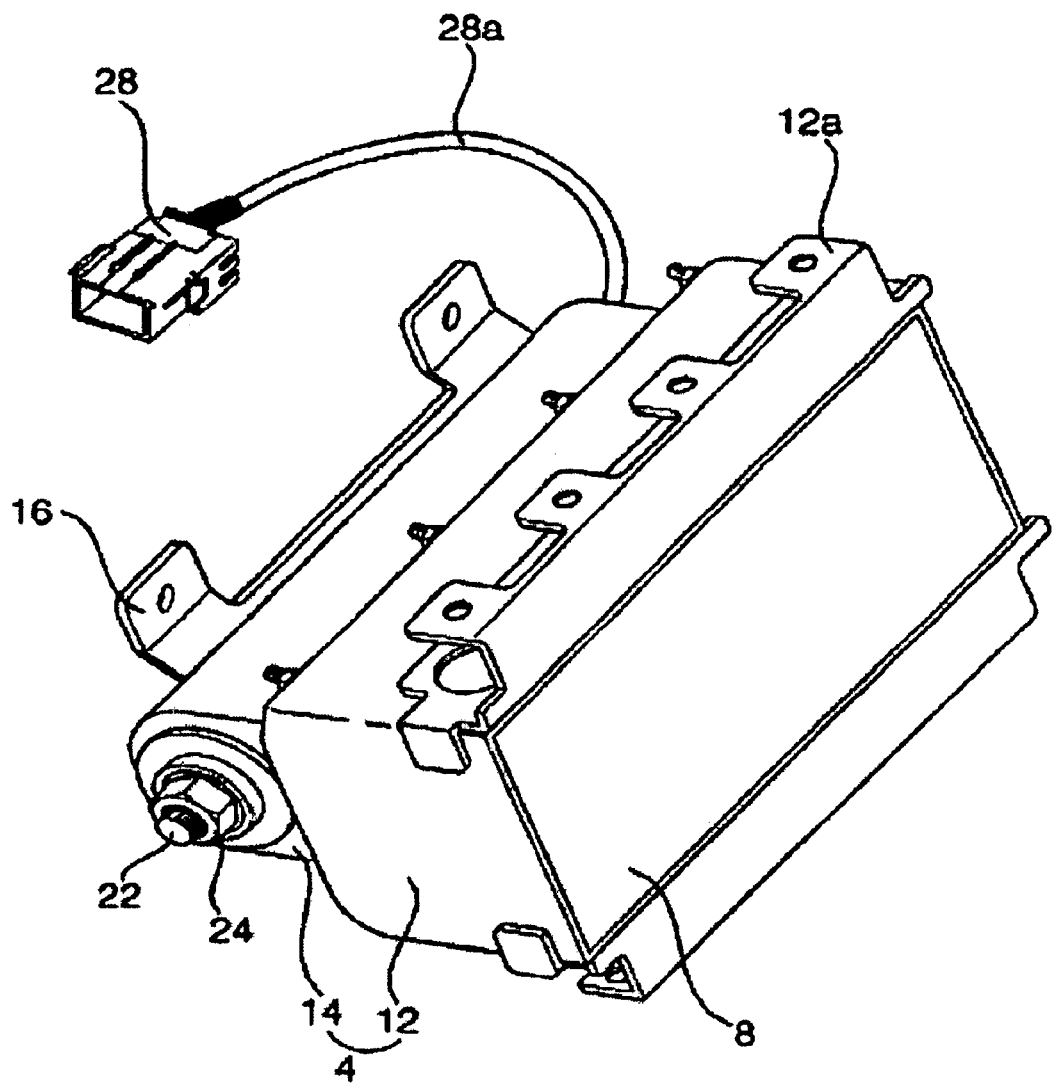
FIG. 1 is a perspective view showing a conventional passenger air bag system.
Figure 2:
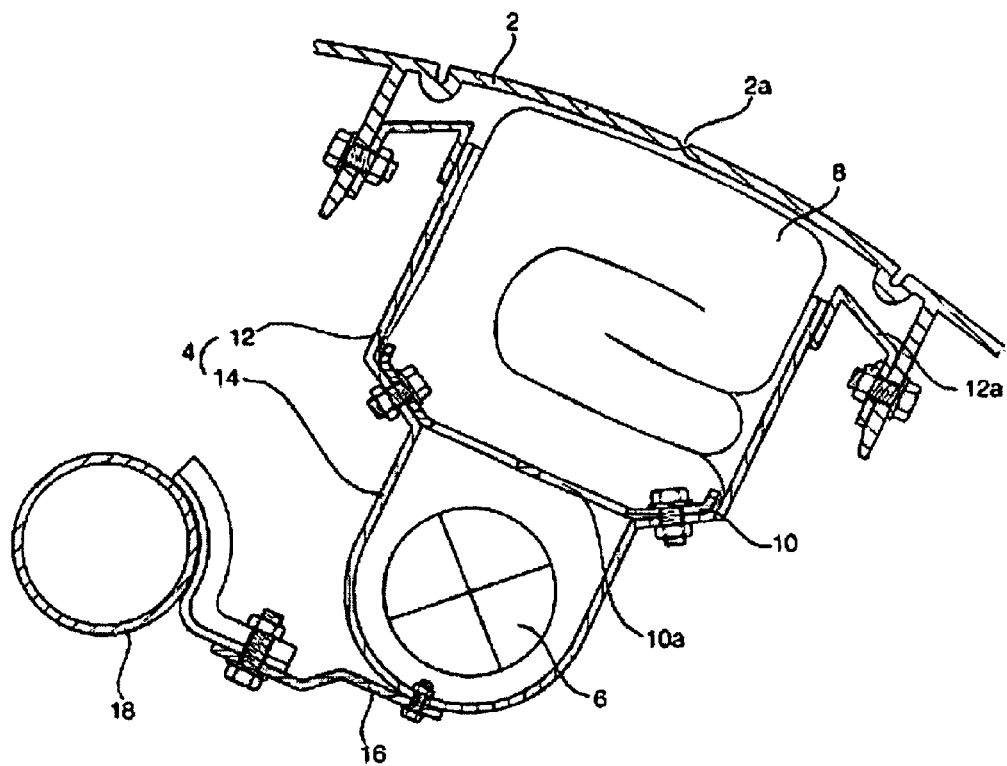
FIG. 2 is a front view, in section, showing the conventional passenger air bag system.
Figure 3:
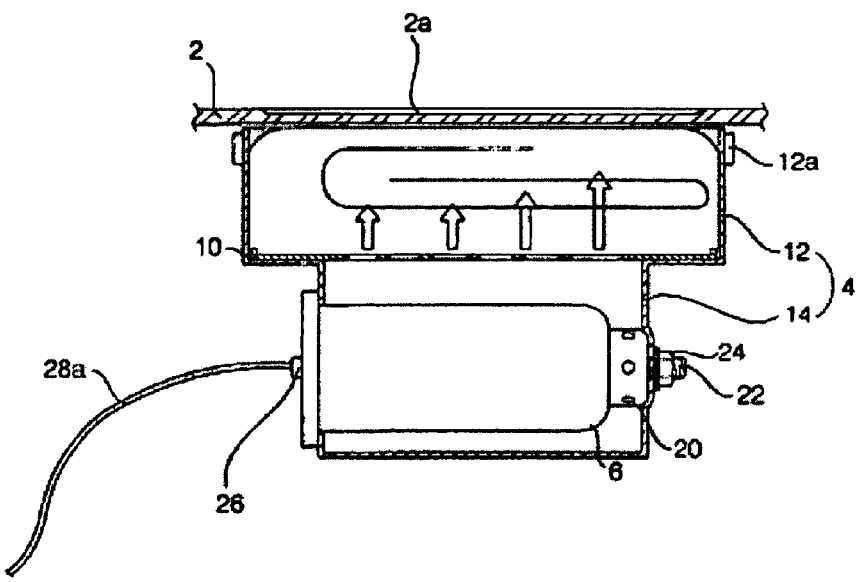
FIG. 3 is a side view, in section, showing the conventional passenger air bag system.
Figure 4:
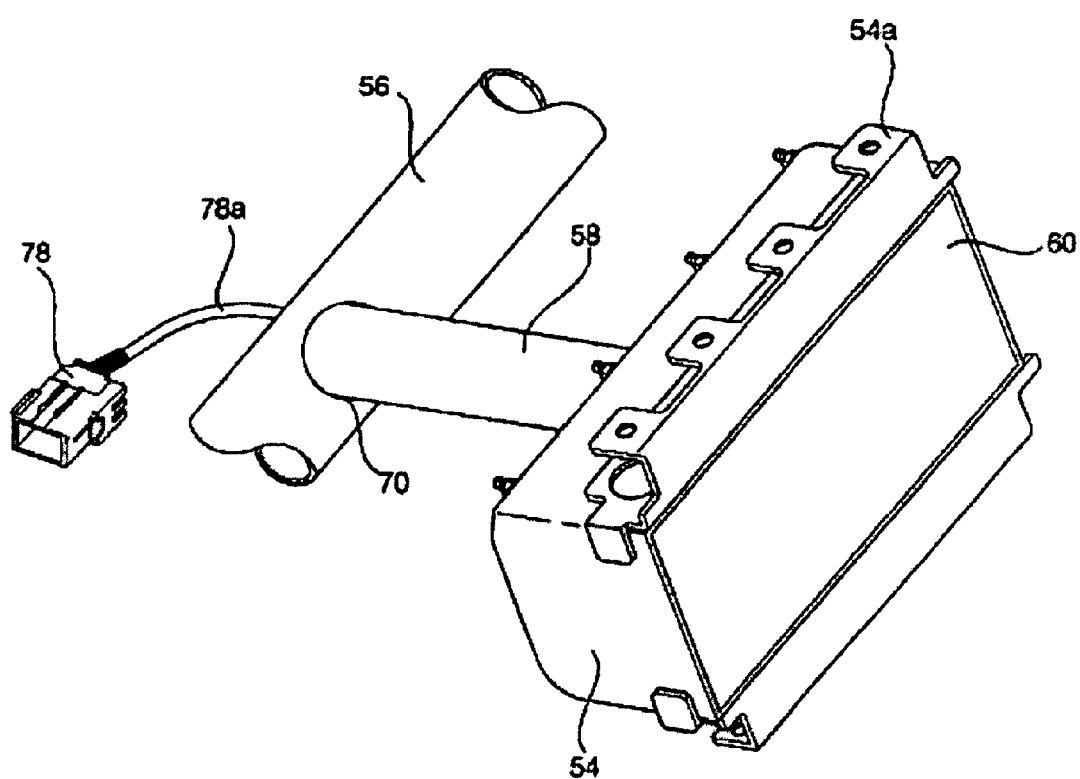
FIG. 4 is a perspective view showing a passenger air bag system according to a preferred embodiment of the present invention.
Figure 5:
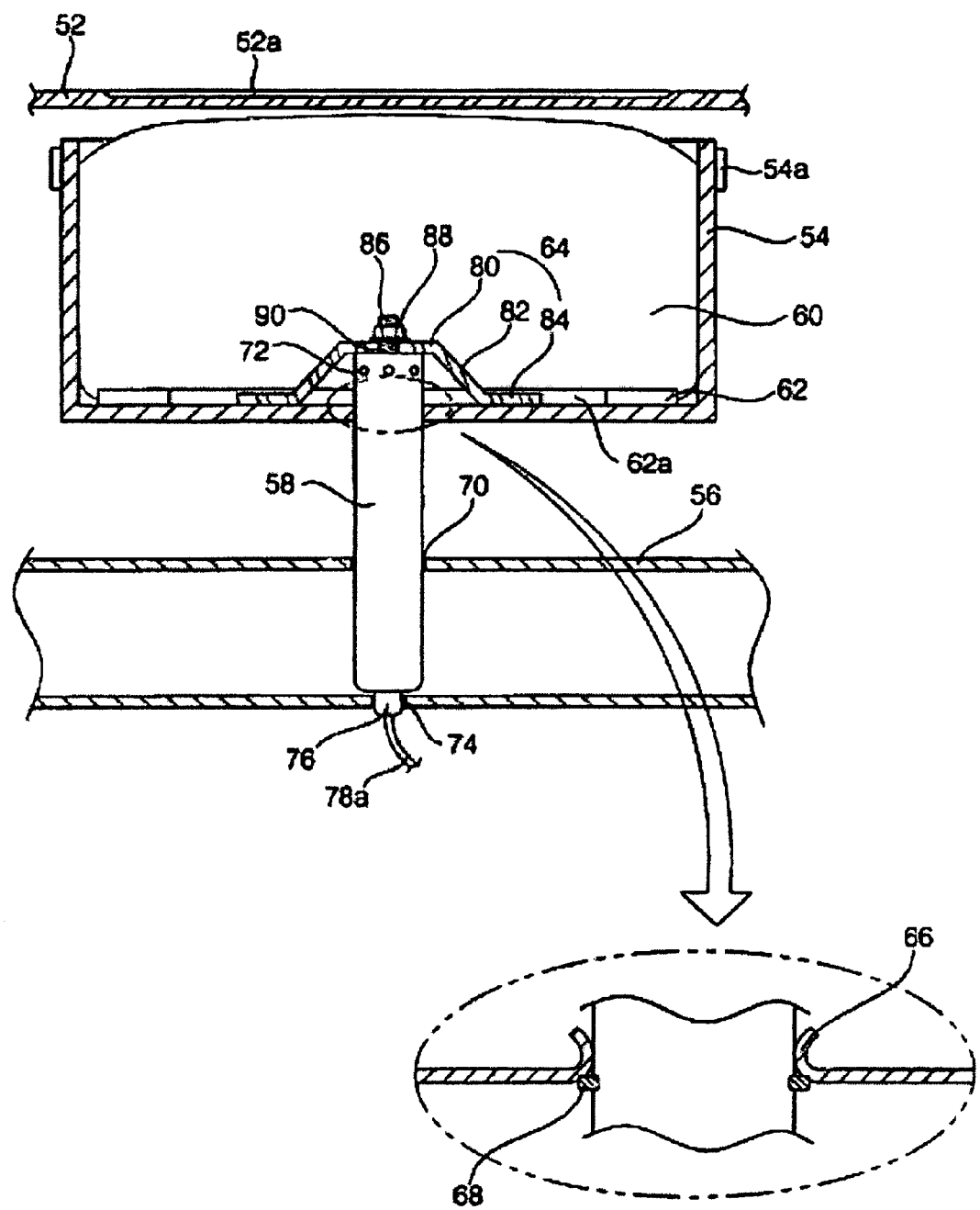
FIG. 5 is a front view, in section, showing the passenger air bag system according to the preferred embodiment of the present invention.
Figure 6:
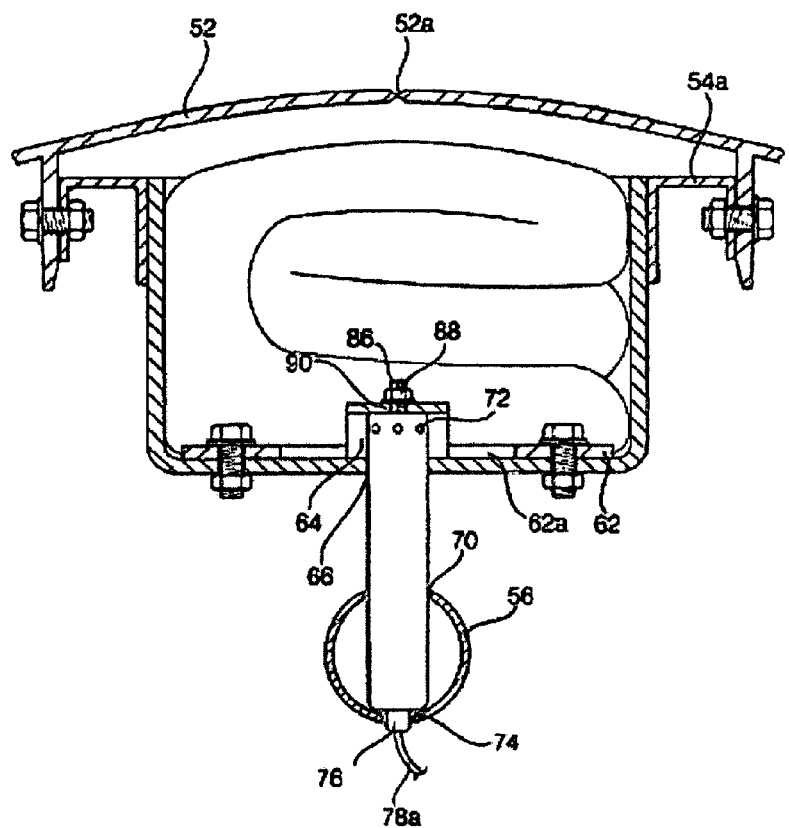
FIG. 6 is a side view, in section, showing the passenger air bag system according to the preferred embodiment of the present invention.
Figure 7:
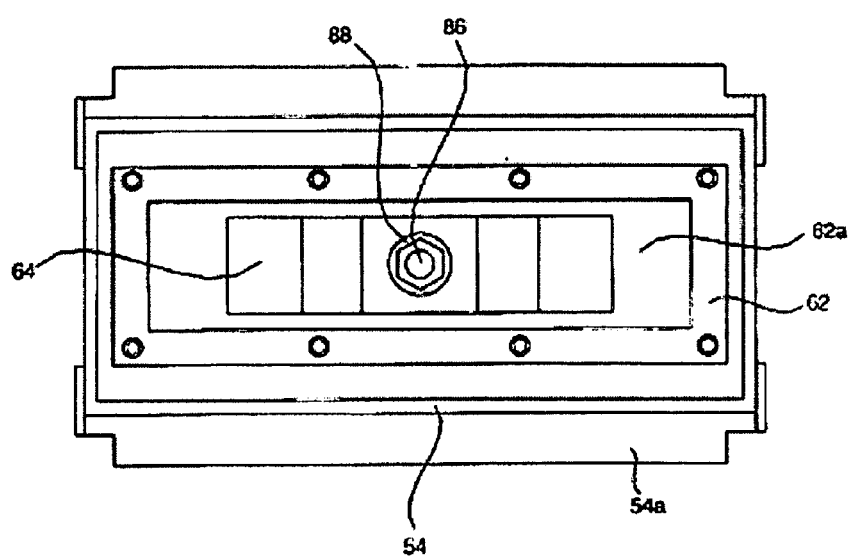
FIG. 7 is a plan view showing the passenger air bag system according to the preferred embodiment of the present invention.
Figure 8:
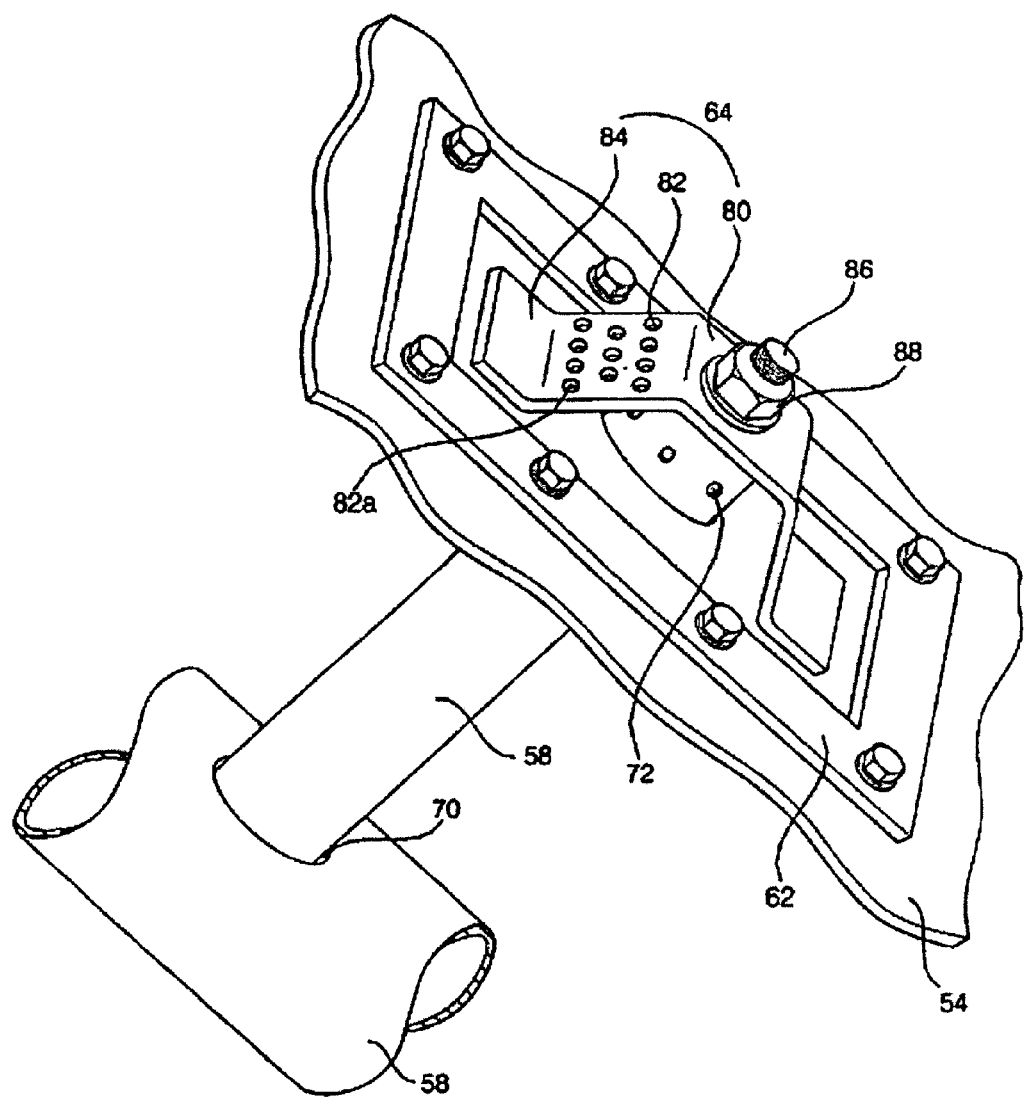
FIG. 8 is a perspective view of the passenger air bag system according to the preferred embodiment of the present invention showing main components of the passenger air bag system.

FIG. 4 is a perspective view showing a passenger air bag system according to a preferred embodiment of the present invention, FIG. 5 is a front view, in section, showing the passenger air bag system according to the preferred embodiment of the present invention, FIG. 6 is a side view, in section, showing the passenger air bag system according to the preferred embodiment of the present invention, FIG. 7 is a plan view showing the passenger air bag system according to the preferred embodiment of the present invention, and FIG. 8 is a perspective view of the passenger air bag system according to the preferred embodiment of the present invention showing main components of the passenger air bag system.

As shown in FIGS. 4 to 8, the passenger air bag system for vehicles according to the present invention comprises: an air bag housing 54 mounted to an instrument panel 52; an inflator 58 having the upper end vertically inserted into the rear part of the air bag housing 54 in the normal direction thereof and the lower end fixed to a cowl cross member 56; a cushion 60 accommodated in the air bag housing 54 such that the cushion 60 is expanded to the front of a passenger seat by means of gas discharged from the inflator 58 when a collision of the vehicle occurs; a retainer 62 attached to the air bag housing 54 for supporting the cushion 60; and an inflator bracket 64 attached to the air bag housing 54. The upper part of the inflator 58 is fixed to the inflator bracket 64 by means of a bolt.

The air bag housing 54 is formed in the shape of a box with the front part opened so that the cushion 60 is accommodated in the air bag housing 54 while being folded. The air bag housing 54 is provided at both longitudinal sides thereof with housing brackets 54a, respectively, which are fixed to the rear part of the instrument panel 52 by means of bolts.

One side of the respective housing brackets 54a is attached to the air bag housing 54, and the other side of the respective housing brackets 54a is bent to the outside of the air bag housing 54 such that the cross section of the respective brackets 54a is formed in the shape of a "]". The bent side of the respective housing brackets 54a is fixed to the instrument panel 52 by means of bolts so that the air bag housing 54 is securely fixed to the rear part of the instrument panel 52.

At the instrument panel 52 is formed a cut line 52a so that the instrument panel 52 is quickly and smoothly broken along the cut line 52a by means of the expanding pressure of the cushion 60 when the cushion 60 is expanded.

The air bag housing 54 formed as described above is provided at the center of the rear part thereof with an inflator-mounting hole 66, through which the upper end of the inflator 58 is mounted. Preferably, the diameter of the inflator-mounting hole 66 is slightly smaller than that of the inflator 58 so that the inflator 58 can be forcibly inserted through the inflator-mounting hole 66.

The inflator 58 is directly mounted to the air bag housing 54 in the vertical direction, which does not require the can housing used in the conventional air bag system. Consequently, the air bag housing 54 is formed with the simple structure.

Since the upper end of the inflator 58 is forcibly inserted through the inflator-mounting hole 66 of the air bag housing 54 as described above, there is provided airtightness between inflator 58 and the inflator-mounting hole 66. Also, the upper end of the inflator 58 is fixed to the air bag housing 54 since the upper end of the inflator 58 is forcibly inserted through the inflator-mounting hole 66 of the air bag housing 54.

There may be provided a seal 68 between the inflator 58 and the inflator-mounting hole 66 in order to secure the airtightness between the inflator 58 and the inflator-mounting hole 66. In this case, it is required that the seal 68 have sufficient thermal resistance and durability to stand high temperature and high pressure of the gas discharged when the inflator 58 is exploded. Consequently, it is preferable that the seal 68 is additionally disposed between the inflator-mounting hole 66 and the inflator 58 forcibly inserted in the inflator-mounting hole 66 instead of simple use of the seal 68.

The inflator 58 is formed in the shape of a cylinder, and vertically attached to the air bag housing 54. Specifically, the upper end of the inflator 58 is directly inserted through the inflator-mounting hole 66, and the lower end of the inflator 58 is inserted through an inflator insertion hole 70 formed at the cowl cross member 56.

The upper end of the inflator 58 is disposed in the air bag housing 54, and on the outer circumference of the inflator 58 adjacent to the upper end of the inflator 58 are formed a plurality of gas-discharging holes 72 for discharging gas when a collision of the vehicle occurs.

The gas-discharging holes 72 are evenly formed along the outer circumference of the inflator 58 adjacent to the upper end of the inflator 58 so that the gas discharged from the inflator 58 is uniformly supplied into the air bag housing 54.

The inflator insertion hole 70 has the same sectional shape as the lower end of the inflator 58. At the lower part of the cowl cross member 56 is formed a connector hole 74, through which a connector-connecting member 76 formed at the lower end of the inflator 58 is inserted.

The connector-connecting member 76 is protruded from the lower end of the inflator 58, and inserted through the connector hole 74 so that the connector-connecting member 76 is disposed outside the cowl cross member 56. To the connector-connecting member 76 is connected a connector 78 via a wire 78a.

One end of the connector 78 is connected to the connector-connecting member 76 of the inflator 58, and the other end of the connector 78 is connected to an external device, such as an electronic control unit (not shown) or a power supply terminal (not shown), so that an operation signal or electric current is transmitted from the external device to the inflator 58 via the connector 78.

The cowl cross member 56 is generally made of a pipe. Consequently, the inflator insertion hole 70 is formed through the upper part of the outer circumference of the cowl cross member 56, which is opposite to the lower end of the inflator 58, and the connector hole 74 is formed through the lower part of the outer circumference of the cowl cross member 56.

The retainer 62 has an opening 62a formed at the center thereof so that the retainer 62 is formed in the shape of a square frame. The retainer 62 is provided along the edge thereof with a plurality of fixing holes, through which fixing bolts are inserted, respectively, so that the retainer 62 is fixed to the inner rear part of the air bag housing 54 by means of the combination of the fixing bolts and the corresponding fixing holes.

In the opening 62a of the retainer 62 is placed the inflator-mounting hole 66. Consequently, the inflator 58 and the inflator bracket 64 are disposed in the opening 62a of the retainer 62.

Specifically, the inflator bracket 64 is disposed inside the opening 62a of the retainer 62. Both ends 84 of the inflator bracket 64 are fixed to the rear part of the air bag housing 54, and the center part 80 of the inflator bracket 64 is protruded to the front part of the air bag housing 54.

A strip-shaped plate is bent several times to form the inflator bracket 64 constructed as described above. At the center part 80 of the inflator bracket 64 is formed a through-hole 90, through which a fixing protrusion 86 formed at the upper end of the inflator 58 is inserted. Between the center part 80 and the ends 84 of the inflator bracket 64 are provided inclined connection parts 82, respectively.

The fixing protrusion 86 has a male screw thread part formed on the outer circumference thereof, on which a fixing nut 88 is rotatably fitted so that the fixing protrusion 86 is securely fixed to the inflator bracket 64. At the center part 80 of the inflator bracket 64 is formed a horizontal fixing surface, on which the fixing protrusion 86 and the fixing nut 88 are smoothly coupled with each other.

After the fixing protrusion 86 is inserted through the through-hole 90 of the inflator bracket 64 from bottom to top, the fixing nut 88 is fitted on the fixing protrusion 86 raised above the inflator bracket 64. In this way, the upper end of the inflator 58 is fixed to the inflator bracket 64.

The inflator bracket 64 is formed such that both sides of the inflator bracket 64 are completely opened. Consequently, the gas discharged from the inflator 58 is smoothly supplied into the cushion 60. Also, at the inclined connection parts 82 of the inflator bracket 64 are formed a plurality of diffuser holes 82a, through which the gas flows, so that flow of the gas is not interrupted due to the inclined connection parts 82.

Now, the operation of the passenger air bag system with the above-stated construction according to the present invention will be described in detail.

When a collision of the vehicle occurs, an operation signal is transmitted from the electronic control unit to the inflator 58 via the connecter 78. The inflator 58 is exploded by means of electric current supplied from the power supply terminal for discharging gas to the air bag housing 54 through the gas-discharging holes 72.

At this time, the gas discharged from the inflator 58 is uniformly diffused in the air bag housing 54 since the upper end of the inflator 58 is disposed at the center of the air bag housing 54 and the gas-discharging holes 72 are evenly formed on the outer circumference of the inflator 58 adjacent to the upper end of the inflator 58. Also, the plurality of diffuser holes 82a are formed at the inclined connection parts 82 of the inflator bracket 64, whereby the connection parts 82 do not act as flow resistance to gas.

Consequently, the gas discharged from the inflator 58 is uniformly supplied into the air bag housing 54, and thus the gas is also uniformly supplied to the cushion 60 accommodated in the air bag housing 54.

When the gas discharged from the inflator 58 is supplied to the cushion 60 as described above, the cushion 60 is expanded according to the designed optimum shape of the cushion without eccentric expansion of the cushion 60, whereby efficiency and safety of the air bag system are guaranteed.

The cushion 60 is expanded at prescribed pressure and speed by means of the gas introduced into the cushion 60. As a result, the instrument panel 52 is broken along the cut line 52a formed at the instrument panel 52, and then the cushion 60 is further expanded to the front of the passenger seat so that shock transmitted to the passenger seated in the passenger seat is effectively absorbed.

As apparent from the above description, the present invention provides a passenger air bag system for vehicles having an inflator directly inserted into an air bag housing through the rear center part of the air bag housing in the normal direction thereof so that gas discharged from the inflator is uniformly supplied to a cushion accommodated in the air bag housing. Consequently, the present invention has an effect of preventing an eccentric phenomenon of a cushion when the passenger air bag system is operated.

As the eccentric phenomenon of the cushion is prevented as described above, the cushion is uniformly expanded, whereby further injury to a passenger due to the eccentric phenomenon of the cushion is avoided, and thus safety and reliability of the passenger air bag system are increased.

Also, the inflator is directly forcibly fitted in the air bag housing, which eliminates the necessity of provision of a can housing for accommodating the inflator therein as in the conventional air bag system. Consequently, the air bag housing according to the present invention is composed of a cushion housing for accommodating the cushion therein.

Since the air bag housing has only the cushion housing as described above, the air bag housing can be manufactured with the simple structure, whereby the number and the total weight of components of the air bag system are reduced.

Furthermore, the air bag system can be easily manufactured, whereby productivity is improved. Also, the cost of manufacturing the air bag system is reduced, whereby competitive power of the air bag system is improved.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A passenger air bag system for vehicles, comprising:
   a cushion expanded to the front of a passenger when a collision of the vehicle occurs;
   an air bag housing mounted to an instrument panel at the front part thereof for accommodating the cushion therein;
   a retainer attached to the air bag housing for supporting the cushion;
   an inflator having an upper end vertically inserted into the rear part of the air bag housing in the normal direction thereof so that the inflator discharges gas to the cushion, and a lower end fixed to the outer circumference of a cowl cross member; and
   an inflator bracket attached to the air bag housing for fixedly supporting the upper end of the inflator.

2. The system as set forth in claim 1, wherein the air bag housing is provided at both sides thereof with housing brackets, respectively, the housing brackets being fixed to the instrument panel.

3. The system as set forth in claim 2, wherein one side of the respective housing brackets is attached to air bag housing, and the other side of the respective housing brackets is bent to the outside of the air bag housing so that the air bag housing is fixed to the instrument panel by means of bolts.

4. The system as set forth in claim 3, wherein the air bag housing is provided at the center of the rear part thereof with an inflator-mounting hole, the upper end of the inflator being inserted through the inflator-mounting hole.

5. The system as set forth in claim 4, wherein the inflator-mounting hole has a diameter smaller than that of the inflator so that the inflator can be forcibly inserted through the inflator-mounting hole.

6. The system as set forth in claim 5, further comprising a seal provided between the inflator and the inflator-mounting hole.

7. The system as set forth in claim 6, wherein the inflator has one or more gas-discharging holes formed on the outer circumference thereof adjacent to the upper end of the inflator, the upper end of the inflator being disposed in the air bag housing.

8. The system as set forth in claim 7, wherein the gas-discharging holes are evenly formed along the outer circumference of the inflator adjacent to the upper end of the inflator.

9. The system as set forth in claim 8, wherein the lower end of the inflator is inserted through an inflator insertion hole formed at the cowl cross member.

10. The system as set forth in claim 9, wherein the inflator insertion hole has the same sectional shape as the lower end of the inflator, and wherein the cowl cross member has a connector hole formed at the lower part thereof so that a connector for connecting the inflator and an external device is connected to a connector-connecting member formed at the lower end of the inflator through the connector hole.

11. The system as set forth in claim 10, wherein the connector-connecting member is protruded from the lower end of the inflator, and inserted through the connector hole so that the connector-connecting member is disposed outside the cowl cross member.

12. The system as set forth in claim 11, wherein the retainer is provided along the edge thereof with a plurality of fixing holes so that the retainer is fixed to the inner rear part of the air bag housing by means of fixing bolts, and wherein the retainer has an opening formed at the center thereof so that the inflator and the inflator bracket are disposed in the rear part of the air bag housing.

13. The system as set forth in claim 12, wherein the retainer is formed in the shape of a square frame.

14. The system as set forth in claim 13, wherein the inflator bracket is disposed inside the opening of the retainer, and wherein both ends of the inflator bracket are fixed to the rear part of the air bag housing, and the center part of the inflator bracket is protruded to the front part of the air bag housing.

15. The system as set forth in claim 14, wherein the inflator bracket is formed by bending a strip-shaped plate several times.

16. The system as set forth in claim 15, wherein the inflator bracket has a through-hole formed at the center part thereof, and the inflator has a fixing protrusion formed at the upper end thereof, the fixing protrusion of the inflator being inserted through the through-hole of the inflator bracket.

17. The system as set forth in claim 16, wherein the fixing protrusion of the inflator has a male screw thread part formed on the outer circumference thereof so that the fixing protrusion of the inflator is securely fixed to the inflator bracket by means of a fixing nut.

18. The system as set forth in claim 17, wherein the inflator bracket has a horizontal fixing surface formed at the center part thereof so that the fixing protrusion of the inflator and the fixing nut are smoothly coupled with each other, and the inflator bracket has inclined connection parts provided between the center part and the ends of the inflator bracket, respectively.

19. The system as set forth in claim 18, wherein the inflator bracket has a plurality of diffuser holes formed at the inclined connection parts thereof for allowing the gas discharged through the gas-discharging holes to pass therethrough.

\* \* \* \* \*